(12) United States Patent
Shimizu

(10) Patent No.: US 7,255,185 B2
(45) Date of Patent: Aug. 14, 2007

(54) DRIVER OF ELECTRIC AUTOMOBILE

(75) Inventor: Hiroshi Shimizu, Kamakura (JP)

(73) Assignee: Japan Science and Technology Agency (JP)

( * ) Notice: Subject to any disclaimer, the term of this patent is extended or adjusted under 35 U.S.C. 154(b) by 36 days.

(21) Appl. No.: 10/524,732

(22) PCT Filed: Jun. 4, 2003

(86) PCT No.: PCT/JP03/07078

§ 371 (c)(1),
(2), (4) Date: Feb. 16, 2005

(87) PCT Pub. No.: WO2004/028852

PCT Pub. Date: Apr. 8, 2004

(65) Prior Publication Data

US 2005/0252701 A1 Nov. 17, 2005

(30) Foreign Application Priority Data

Sep. 24, 2002 (JP) ............................. 2002-277030

(51) Int. Cl.
*B60K 1/00* (2006.01)
(52) U.S. Cl. ...................................... 180/65.1; 180/236
(58) Field of Classification Search ................ 180/65.1, 180/6.28, 24.01, 236
See application file for complete search history.

(56) References Cited

U.S. PATENT DOCUMENTS

| | | | | |
|---|---|---|---|---|
| 3,756,335 A | * | 9/1973 | Eisele et al. | 180/6.28 |
| 5,453,930 A | | 9/1995 | Imaseki et al. | 364/424.01 |
| 5,465,806 A | * | 11/1995 | Higasa et al. | 180/165 |
| 5,686,818 A | * | 11/1997 | Scaduto | 180/65.1 |
| 5,803,197 A | * | 9/1998 | Hara et al. | 180/248 |
| 5,984,435 A | * | 11/1999 | Tsukamoto et al. | 303/191 |
| 6,405,514 B1 | * | 6/2002 | Guertin | 56/10.9 |
| 6,688,612 B1 | * | 2/2004 | Burdock et al. | 280/5.502 |
| 6,749,037 B2 | * | 6/2004 | Lindholdt | 180/242 |

FOREIGN PATENT DOCUMENTS

| | | |
|---|---|---|
| JP | 5-76106 | 3/1993 |
| JP | 7-298418 | 10/1995 |
| JP | 10-295004 | 4/1998 |
| JP | 2001-158254 | 12/2001 |

* cited by examiner

*Primary Examiner*—Christopher Bottorff
(74) *Attorney, Agent, or Firm*—Bacon & Thomas, PLLC

(57) ABSTRACT

There is provided a driving device of an electric car, exactly selecting drive wheels of the electric car in accordance with road circumstances. In the electric car having four or more wheels, all wheels (1 to 4) have driving motors (5 to 8) placed therein, capable of driving and regenerative braking, and a plurality of the wheels (1 to 4) are selected so as to serve as drive wheels or regenerative brake wheels in accordance with traveling circumstances of the car.

5 Claims, 2 Drawing Sheets

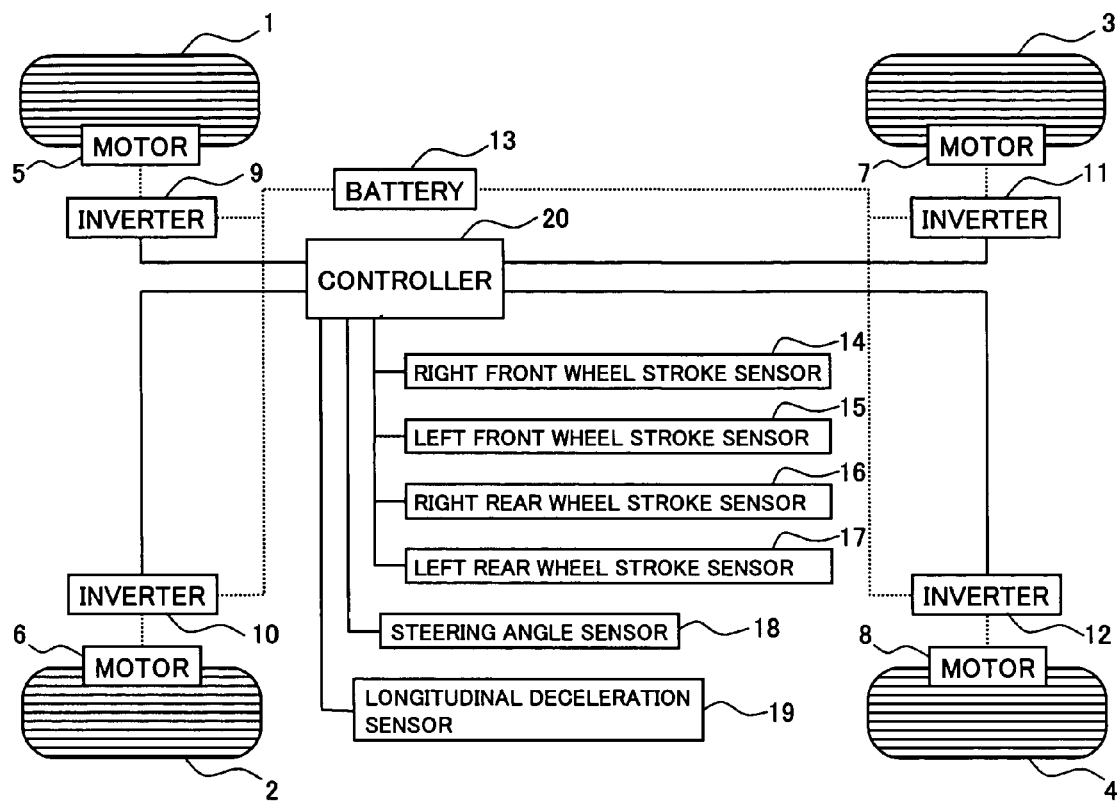
F I G. 1
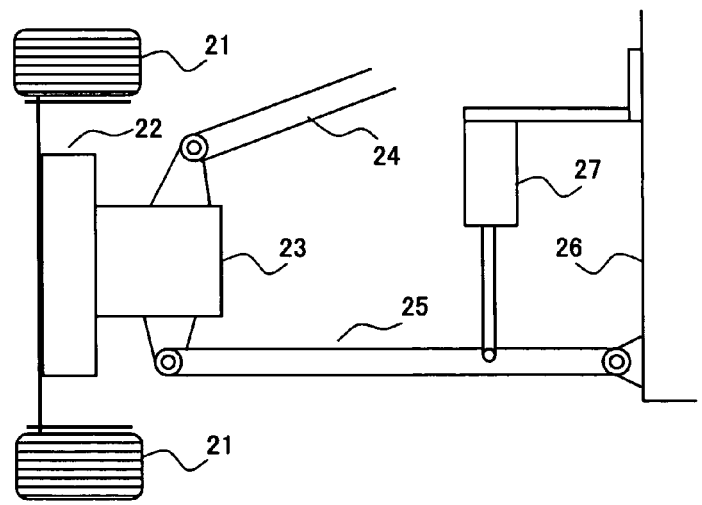
F I G. 2

DRIVER OF ELECTRIC AUTOMOBILE

CROSS-REFERENCE TO RELATED APPLICATIONS

This application is a National Phase Application (35 USC 371) of PCT/JP2003/007078 and claims priority of Japanese Application No. 2002-277030, filed Sep. 24, 2002.

TECHNICAL FIELD

The present invention relates to an electric car equipped with driving motors, and more particularly, it relates to a driving device capable of selecting drive wheels or regenerative brake wheels in accordance with traveling circumstances of the electric car.

BACKGROUND ART

As a driving device of an electric car, it is most preferable that all wheels have the driving motors placed therein so as to control the respective drive forces in accordance with respective loads exerted thereon. In other words, by applying a drive force on each wheel in proportion to a load exerted on the wheel, making use of the frictional force between the tire of the wheel and the road surface can be maximized and a spin phenomenon of the wheel under acceleration can be minimized.

DISCLOSURE OF INVENTION

Unfortunately, with respect to an all-wheel drive electric car, since a necessary drive force of the car is shared by all wheels, an output of the motor of each wheel is relatively small, and in particular, in normal driving constituting the majority of driving of the car, an output of the motor is merely a fraction of the maximum output, thereby causing a problem that the motor is obliged to be used in a poor efficient region.

In view of the above-described situation, it is an object of the present invention to provide a driving device of an electric car, exactly selecting drive wheels according to road circumstances.

In order to achieve the above-mentioned object, according to the present invention, (1) There is provided a driving device of an electric car having four or more wheels, all wheels having driving motors placed therein, capable of driving and regenerative braking. A plurality of the wheels are selected so as to serve as drive wheels or regenerative brake wheels in accordance with traveling circumstances of the car.

(2) In the driving device of an electric car set in the foregoing (1), upon traveling on a level road and an upslope, the rear wheels or a group of the rear wheels are selected so as to serve as the drive wheels, and, upon traveling on a downslope, the front wheels or a group of the front wheels are selected so as to serve as the drive wheels.

(3) In the driving device of an electric car set forth in the foregoing (1), the radially outer wheels are selected so as to serve as the drive wheels upon turning.

(4) In the driving device of an electric car set forth in the foregoing (1) or (2), all wheels are selected so as to serve as the regenerative brake wheels upon braking.

(5) In the driving device of an electric car set forth in the foregoing (3), the radially inner wheels are selected so as to serve as the regenerative brake wheels upon turning.

(6) In the driving device of an electric car set forth in the foregoing (1) or (2), strokes of suspensions are used as determining information of traveling circumstances for selecting the drive wheels.

(7) In the driving device of an electric car set forth in the foregoing (3), a steering angle of a steering wheel is used as determining information upon turning.

BRIEF DESCRIPTION OF THE DRAWINGS

FIG. 1 is a structural diagram of a drive system of an electric car according an embodiment of the present invention.

FIG. 2 is a diagrammatic view of a drive mechanism of the electric car according the embodiment of the present invention.

BEST MODE FOR CARRYING OUT THE INVENTION

Figure 3:
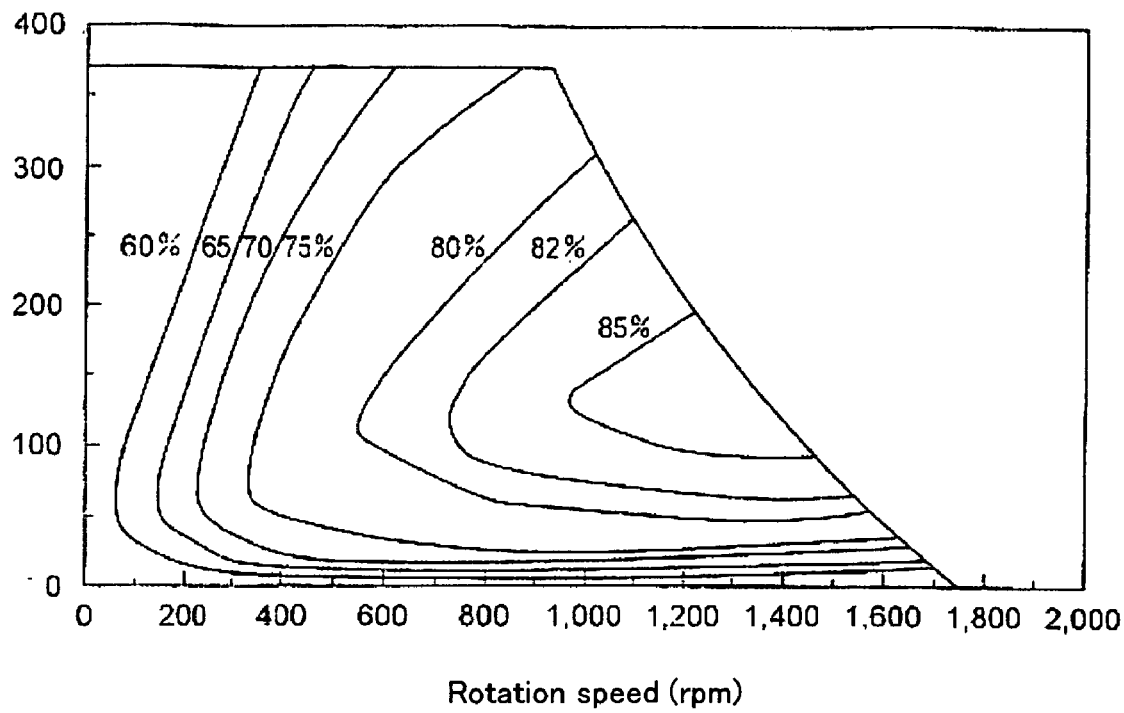
FIG. 3 is an efficiency characteristic diagram of a driving motor of the electric car.

An embodiment of the present invention will be described in detail.

FIG. 1 is a structural diagram of a drive system of an electric car according the embodiment of the present invention, and FIG. 2 is a diagrammatic view of a drive mechanism of the same.

With respect to reference numbers appearing in FIG. 1, 1 denotes a right front wheel, 2 denotes a left front wheel, 3 denotes a right rear wheel, 4 denotes a left rear wheel, 5 denotes a right front wheel driving motor, 6 denotes a left front wheel driving motor, 7 denotes a right rear wheel driving motor, 8 denotes a left rear wheel driving motor, 9 denotes an inverter connected to the right front wheel driving motor 5, 10 denotes an inverter connected to the left front wheel driving motor 6, 11 denotes an inverter connected to the right rear wheel driving motor 7, 12 denotes an inverter connected to the left rear wheel driving motor 8, 13 denotes a battery connected to the respective inverters 9 to 12, 14 denotes a right front wheel stroke sensor, 15 denote a left front wheel stroke sensor, 16 denotes a right rear wheel stroke sensor, 17 denotes a left rear wheel stroke sensor, 18 denotes a steering angle sensor, 19 denotes a longitudinal deceleration sensor, and 20 denotes a controller receiving information from each of the sensors 14 to 19 and controlling each of the inverters 9 to 12.

With respect to reference numbers appearing in FIG. 2, 21 denotes each wheel, 22 denotes a brake mechanism 22 disposed in each wheel 21, 23 denotes a motor connected to each wheel 21, 24 denotes an upper arm, 25 denotes a lower arm, 26 denotes a part of the car body (car body side), and 27 denotes a stroke sensor disposed between the lower arm 25 and the part of the car body (car body side) 26.

The efficiency characteristic of the driving motor of the electric car will be described.

FIG. 3 is an efficiency characteristic diagram of the driving motor of the electric car.

As is obvious from FIG. 3, the overall efficiency of the electric car including the motors, a reduction gear, and the inverters is highest in the region of 30 to 40% of the maximum torque and decreases as the torque is reduced; especially, it decreases sharply in a low torque region.

Accordingly, in order to use the motor in an excellently efficient region, its use in a very low torque region must be avoided.

To this object, according to the present invention, in order to use the driving motor in an excellently efficient region, front wheel drive or rear wheel drive is selected in accordance with loads exerted on the wheels so as to halve the number of the drive wheels. In other words, by doubling a drive torque of the motor, the motor torque is kept at a relatively high value even in normal driving constituting the majority of traveling; thus, the motor is used in a higher efficient region.

Also, at the same time, in order to prevent reduction in utilization rate of the road frictional force, which is a drawback of two wheel (or half-the-number-of-wheel) drive, of the front wheels or the rear wheels, the wheels (or a group of the wheels) having greater loads exerted thereon are selected so as to serve as the drive wheels.

Its embodiment will be described in detail below.

Figure 4:
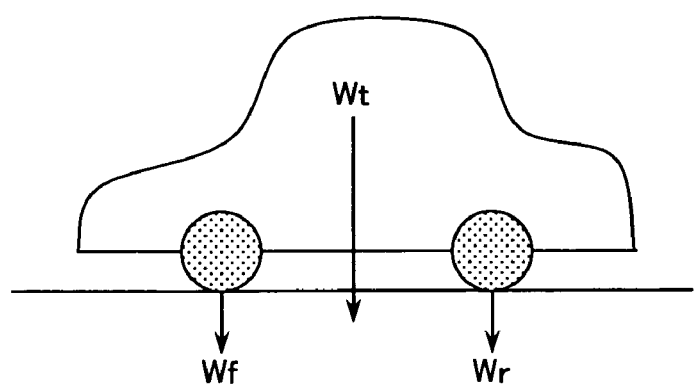
FIG. 4 is a diagrammatic view of a load exerted on the electric car.

FIG. 4 is a diagrammatic view of a load exerted on the electric car.

As shown in FIG. 4, when the gross weight of the car, a front wheel load, a rear wheel load, a coefficient of friction between the tire and the road surface are respectively defined by Wt, Wf, Wr, and $\mu$, and when rear wheel drive is considered, the maximum drive force is limited by Wr×$\mu$. Also, the utilization rate of the frictional force of the road surface is given by Wr/Wt. Accordingly, in order to effectively use the frictional force of the road surface, it is desirable to select the wheels of all wheels, having a greater load exerted thereon.

Then, detection of a wheel load of the electric car will be described.

The front and rear wheel loads are not always constant but vary in accordance with the gradient of the road surface, acceleration, and deceleration. Table 1 shows the varying tendency.

TABLE 1

|  | Upslope | Downslope | Acceleration | Deceleration |
| --- | --- | --- | --- | --- |
| Front wheel load | decrease | increase | decrease | increase |
| Rear wheel load | increase | decrease | increase | decrease |

Although a variety of sensors such as a speed sensor are available as means for detecting the gradient of the road surface or acceleration and deceleration, serving as variable factors of the foregoing wheel loads, in order to accurately detect a load and a change in loads exerted on each wheel, a vertical change of a suspension of the wheel is most preferably detected by the stroke sensor 27 disposed between the lower arm 25 and the part of the car body (car body side) 26 as shown in FIG. 2. Since the deformation of the suspension spring changes in proportion to the wheel load, the wheel load can be accurately detected by measuring the vertical change of the suspension with the stroke sensor 27. More particularly, by measuring the vertical changes of the respective wheels with the right front wheel stroke sensor 14, the left front wheel stroke sensor 15, the right rear wheel stroke sensor 16, and the left rear wheel stroke sensor 17 shown in FIG. 1, the respective wheel loads are accurately detected; the detected values are sent to the controller 20; the inverters 9 to 12 are controlled in accordance with output signals of the controller 20; and the driving motors 5 to 8 placed in the respective wheels 1 to 4 are appropriately driven.

As a result, the motors can be effectively driven in accordance with the loads of the corresponding wheels.

Subsequently, regenerative brake of the electric car will be described.

The regenerative brake puts on brakes such that the driving motors 5 to 8 works as generators and the battery 13 works as a load by sending generated electricity into the battery 13.

Accordingly, whether or not the regenerative brake is sufficiently effective depends on an amount of electric discharge of the battery 13; hence, when the battery 13 is nearly in a state of being fully charged, the battery 13 is difficult to charge electricity further, whereby the regenerative brake does not work sufficiently.

When the battery 13 is divided into two systems, the discharging state of the battery 13 varies in accordance with the respective systems; hence, from the viewpoint of recovering energy, all drive wheels are most preferably subject to the regenerative brake so as to recover energy in accordance with the respective charging states.

Thus, according to the present invention, either the front or rear wheels are selected so as to serve as the drive wheels in accordance with the gradient of the road surface, whereby the road surface friction is effectively made use of, and also the motors are used in the excellently efficient middle torque range.

Although there is a problem that the magnitude of the regenerative brake force is limited to a large extent, depending on the depth of discharge of the source battery, all wheels can serve as the regenerative brake wheels according to the present invention, thereby more effectively recovering energy.

Also, according to the present invention, upon turning, by selecting the radially outer and inner wheels so as to serve as the drive and regenerative brake wheels, respectively, on the basis of the output of the steering angle sensor 18, the turning is smoothly carried out.

Further, by applying regenerative brake on the radially inner wheels upon turning, the turning can be more sharply carried out.

As described above, in an electric car having four or more wheels, driving motors capable of driving and regenerative braking are disposed in all wheels and also, of these wheels, the drive wheels and the regenerative brake wheels are selected in accordance with traveling circumstances. More particularly, (1) Either the front or rear wheels are selected so as to serve as the drive wheels in accordance with the gradient of the road surface.

(2) Upon turning, the outer and inner wheels are selected respectively as the drive wheels and the regenerative brake wheels. That is, a system is presented in which the drive wheels or the regenerative brake wheels are selected in accordance with the gradient of the road surface or the turning direction and offers advantages in utilization efficiency of the road surface friction and traveling stability.

The present invention is not limited to the foregoing embodiment and a variety of modifications are possible on the basis of the spirit of the present invention; hence, these modifications should not be excluded from the scope of the present invention.

As described above in detail, the present invention offers the following advantages.

(A) Upon traveling on an upslope or a level road, by selecting the rear wheels, having greater loads exerted thereon due to the gradient of the road surface or the acceleration, so as to serve as the drive wheels, and also, upon traveling on a downslope, by selecting the front wheels having greater loads exerted thereon due to the gradient of the road surface, the motors can be used in an excellently efficient region, thereby providing sufficient drives;

(B) Also, by making use of all wheels as the regenerative brake wheels, energy is effectively recovered.

(C) Also, by selecting the radially outer wheels as the drive wheels upon turning, the turning is smoothly carried out, and by further applying regenerative brake on the inner wheels, the turning can be carried out with a smaller turning-radius.

(D) In addition, by using strokes of suspensions, the gradient of the road surface is easily detected. Also, turning information such as a direction, a magnification, and the like of turning can be easily detected by using a steering angle of a steering wheel.

INDUSTRIAL APPLICABILITY

The present invention offers a drive mechanism in which a sufficient drive force is obtained by using motors in an excellently efficient region and which is therefore suitable for a driving device of an electric car.

The invention claimed is:

1. A driving device of an electric car having four or more wheels, all wheels having driving motors capable of driving and regenerative braking, placed therein, wherein a single controller is connected to the driving motors via corresponding inverters, the controller being further connected to a right front wheel stroke sensor, a left front wheel stroke sensor, a right rear wheel stroke sensor, a left rear wheel stroke sensor, a steering angle sensor, and a longitudinal deceleration sensor, a plurality of the wheels are selected so as to serve as drive wheels or regenerative brake wheels in accordance with traveling circumstances of the car, and wherein all wheels are selected so as to serve as the regenerative brake wheels upon braking and the rear wheels or a group of the rear wheels are selected so as to serve as the drive wheels upon traveling on a level road and an upslope, and the front wheels or a group of the front wheels are selected so as to serve as the drive wheels upon traveling on a downslope.

2. The driving device of an electric car according to claim 1, wherein the radially outer wheels are selected so as to serve as the drive wheels upon turning.

3. A driving device of an electric car having four or more wheels, all wheels having driving motors capable of driving and regenerative braking, placed therein, wherein a single controller is connected to the driving motors via corresponding inverters, the controller being further connected to a right front wheel stroke sensor, a left front wheel stroke sensor, a right rear wheel stroke sensor, a left rear wheel stroke sensor, a steering angle sensor, and a longitudinal deceleration sensor, a plurality of the wheels are selected so as to serve as drive wheels or regenerative brake wheels in accordance with traveling circumstances of the car, and wherein the radially outer wheels are selected so as to serve as the drive wheels and the radially inner wheels are selected so as to serve as the regenerative brake wheels upon turning.

4. A driving device of an electric car having four or more wheels, all wheels having driving motors capable of driving and regenerative braking, placed therein, wherein a single controller is connected to the driving motors via corresponding inverters, the controller being further connected to a right front wheel stroke sensor, a left front wheel stroke sensor, a right rear wheel stroke sensor, a left rear wheel stroke sensor, a steering angle sensor, and a longitudinal deceleration sensor, a plurality of the wheels are selected so as to serve as drive wheels or regenerative brake wheels in accordance with traveling circumstances of the car, and wherein strokes of suspensions are used as determining information of the traveling circumstances for selecting the drive wheels.

5. The driving device of an electric car according to claim 4, wherein, upon traveling on a level road and an upslope, the rear wheels or a group of the rear wheels are selected so as to serve as the drive wheels, and, upon traveling on a downslope, the front wheels or a group of the front wheels are selected so as to serve as the drive wheels.

* * * * *